3,069,386
THERMOPLASTIC AROMATIC POLYFORMAL RESINS AND PROCESS FOR PREPARING SAME
Robert Barclay, Jr., New Brunswick, N.J., assignor to Union Carbide Corporation, a corporation of New York
No Drawing. Filed Feb. 4, 1959, Ser. No. 791,032
18 Claims. (Cl. 260—49)

This invention relates in general to polyformal resins and more particularly it relates to novel copolymers containing formal and carbonate linkages.

It has formerly been proposed to prepare resins of the conventional phenol-formaldehyde type by reacting a methylene halide such as methylene chloride with phenol at elevated temperatures and in the presence of various bases. In such reactions the halide does not react directly with the phenol, but instead is first hydrolyzed to form, in situ, formaldehyde or hexamethylenetetramine, depending upon the base employed, which in turn reacts with the phenol in the well-known manner.

It has also been proposed to prepare linear polyformals of aliphatic diols by such methods as an interchange reaction between a glycol and a dialkyl formal. Typical polymers of this class however have quite low melting points; polydecamethylene formal, for example, having a melting point of about 58 to 63° C. Efforts to prepare the corresponding aromatic polyformals from diphenols by using an exchange mechanism resulted in nuclear substitution of the aromatic reactant and the formation of a resin of the phenol-formaldehyde type.

I have now discovered that a new class of thermoplastic resins can be prepared by first reacting a methylene halide with the double alkali metal salt of a dihydric phenol to form an aromatic polyformal, and thereafter phosgenating the aromatic polyformal in an alkaline medium to form a phenol-carbonate block type copolymer of high molecular weight.

In forming the aromatic polyformal compounds the double alkali metal salts of any of the large number of dihydric phenols well-known in the art may be suitably employed as the starting material. The term "dihydric phenol" as used throughout the specification and claims is generic and is intended to include bisphenols and the corresponding ring substituted compounds thereof; 4,4'-dihydoxydiphenylsulfones; dihydroxybenzenes and other like compounds which are capable of polymerizing by bond formation through the phenolic hydroxyl oxygen. Illustrative of the broad class of dihydric phenols which may suitably be employed in the practice of this invention are (4,4'-dihydroxy-diphenyl)methane;
2,2-(4,4'-dihydroxy-diphenyl)propane;
1,1-(4,4'-dihydroxy-diphenyl)cyclohexane;
1,1-(4,4'-dihydroxy-3,3'-dimethyl-diphenyl)cyclohexane;
1,1-(2,2'-dihydroxy-4,4'-dimethyl-diphenyl)butane;
2,2-(2,2'-dihydroxy-4,4'-di-tert-butyl-diphenyl)propane;
1,1-(4,4'-dihydroxy-diphenyl)-1-phenyl-ethane;
2,2-(4,4'-dihydroxy-diphenyl)butane;
3,3-(4,4'-dihydroxy-diphenyl)pentane;
2,2-(4,4'-dihydroxy-diphenyl)hexane;
3,3-(4,4'-dihydroxy-diphenyl)hexane;
2,2-(4,4'-dihydroxy-diphenyl)tridecane;
2,2-(4,4'-dihydroxy-3'-methyl-diphenyl)propane;
2,2-(4,4'-dihydroxy-3-methyl-3'-isopropyl-diphenyl)-butane;
2,2-(3,5,3',5'-tetrachloro-4,4'-dihydroxy-diphenyl)-propane;
2,2-(3,5,3',5'-tetrabromo-4,4'-dihydroxy-diphenyl)-propane;
(2,2'-dihydroxy-5,5'-difluoro-diphenyl)methane;
(4,4'-dihydroxy-diphenyl)-phenyl-methane;
1,3-dihydroxybenzene and 1,4-dihydroxy benzene;
and mixtures thereof.

Of the dihydric phenols, those compounds which are categorized as di-(mono-hydroxylphenyl)-substituted aliphatic hydrocarbons in which both hydroxyphenyl groups are attached to the same carbon atom of the hydrocarbon are preferred. Particularly preferred is 2,2-(4,4'-dihydroxy-diphenyl)propane.

These dihydric phenols and others of the same class are well-known in the art and have frequently been employed in the production of carbonate type polymers in which the repeating monomeric units are linked solely by carbonate groups.

Since the polyformals and formal-carbonate polymers of this invention may be considered as condensation polymers, the repeating units which are linked together by carbonate and formal groups may conveniently be described as dihydric phenol residues. By the term dihydric phenol residue, as it appears hereinafter in the specification and claims, is meant that portion of a given dihydric phenol which remains after splitting off both of the functional ring-attached hydroxyl groups. For example, the dihydric phenol residue of hydroquinone is a p-phenylene radical, and the dihydric phenol residue of 2,2-(4,4'-dihydroxy-diphenyl)methane is structurally:

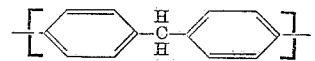

Any methylene halide may be reacted with the above-described dihydric phenol salts to produce the intermediate polyformal compound. Such methylene halides are not restricted to those containing only a single halide specie, but also includes those containing two different species. Chlorobromomethane, for instance, has been found to particularly suitable, and is the preferred methylene halide in the practice of this invention.

The reaction of dispenolate constituent with the methylene halide is best carried out in the presence of an inert polar solvent, advantageously free of hydroxyl groups, and preferably in a substantially anhydrous system. The solvent employed should be substantially inert to the reaction and contain no functional groups such as hydroxyl, amine and the like, which could interfere with the desired reaction. Particularly suitable as a solvent medium is dimethyl sulfoxide although other conventional inert polar solvents such as dimethyl formamide, or the dimethyl ether of diethylene glycol may be used. Small quantities of water and other impurities containing hydroxyl groups may be tolerated, but such impurities tend to cause undesirable side reactions and should be excluded insofar as possible.

The condensation reaction of methylene halide with the diphenolate is moderately exothermic and proceeds at a satisfactory rate at ambient room temperatures of about 25° C. The reaction temperature is however not narrowly critical and in general may be maintained in the range of from about 0° C. to about 150° C. depending upon the reactivity of the diphenolate employed. The range of about 50° C. to about 65° C. has been found to be most advantageous, particularly when the alkali salt of 2,2-(4,4'-dihydroxy-diphenyl)propane is used.

The relative proportions of methylene halide, diphenolate, and polar solvent making up the reaction system are not critical and may be varied over a wide range. Since each methylene halide molecule is capable of reacting with one of the two reactive points of each of two diphenolate molecules, the stoichiometrical amount of methylene halide is one mole for each mole of diphenolate compound present. Equal molar concentrations of each of the two reactants are therefore preferred, but a greater or lesser proportion of one of the two reactants does not detectably alter the structure or properties of the polyformal product obtained.

Polyformals resulting from the reaction of methylene halide and the dihydric phenol are believed to be composed of repeating units which have the general structure:

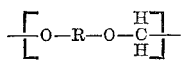

in which R represents the dihydric phenol residue. When a mixture of dihydric phenols are employed, the residue (R) will of course not be the same in each repeating unit. Variations in physical properties within certain limits may therefore be achieved by using various mixtures of dihydric phenols.

The intermediate linear aromatic polyformal compound is converted to the desired polycarbonate-polyformal block copolymer by phosgenating the polyformal under alkaline conditions in the presence of an inert organic solvent therefor. A wide variety of inert solvents are suitable and include such well-known compounds as cyclohexane, methylcyclohexane, benzene, toluene, xylene, chloroform and methylene chloride.

One method of carrying out the phosgenation of the intermediate polyformal which has been found to be particularly suitable consists in introducing phosgene into a suspension or solution comprising an alkaline medium, preferably aqueous alkali metal or alkaline earth metal bases such as lithium hydroxide, sodium hydroxide, potassium hydroxide, or calcium hydroxide, one or a mixture of two or more of the above-described inert organic solvents, and the polyformal intermediate. In the presence of water, the organic solvent tends to promote the reaction by serving as a solvent for the phosgene introduced and as a solvent for the polycarbonate produced. As phosgene is bubbled into the reaction mixture the temperature of the system is preferably maintained between about 25° C. and 28° C. although temperatures in the range of about 20° C. to about 40° C. may be used particularly if the rate of addition of phosgene is such as to complete the phosgenation reaction during a period of about two hours or less.

The quantity of base added, either in the initial charge to the reaction system, or simultaneously with the addition of phosgene, is not narrowly critical, but should be sufficient to convert the intermediate polyformal to be corresponding salt form if such conversion has not already been accomplished prior to charging the polyformal to the reaction system. Although there is no pronounced tendency of the polycarbonate produced by the phosgenation reaction to degrade in the presence of strong caustic, maintaining the basicity of the reaction mass at a pH in the range of from about 9 to about 12 lessens side reactions which among other effects causes unnecessary consumption of phosgene. Shortened reaction periods are also effective in achieving economical operation and needless prolongation therefore of the phosgenation reaction should be avoided. Reaction periods of 2 hours or less are generally adequate.

Advantageously oxygen is excluded both from the phosgenation reaction and from the condensation reaction in which the intermediate polyformal is formed. Any convenient conventional means such as continuously purging the system with nitrogen or other inert gas, or adding an antioxidant such as sodium or potassium sulfite to the reaction system is adequate to inhibit oxidation in both reactions.

When the phosgenation reaction is complete, the molecular weight of the polyformal-polycarbonate resin formed may be increased by bodying the resin. Bodying is accomplished by adding a quaternary ammonium salt such as benzyltrimethylammonium chloride to the resin and stirring the mixture under alkaline conditions. The high molecular weight polyformal-polycarbonate resin resulting from the bodying operation is a block copolymer containing a series of repeating aromatic units corresponding to the nucleus of the dihydric phenol used to prepare the polyformal, these units being linked either by formal or carbonate groups with formal linkages predominating. For instance, if 2,2-(4,4'-dihydroxy-diphenyl)propane is used to form the polyformal, the final block polymer will have a structural formula resembling:

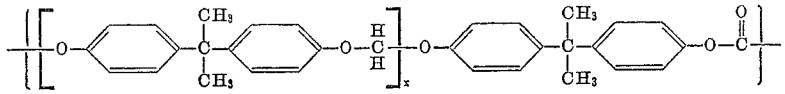

wherein $x$ is dependent in the main upon the molecular weight of the intermediate polyformal.

The formal-carbonate copolymers produced according to the present invention are elastic thermoplastic materials having generally lower softening points than the heretofore known polycarbonate resins containing only carbonate linkages. The overall physical properties of these new polymers depend greatly upon the particular dihydric phenol used to form the intermediate polyformal. As a class, however, they possess superior toughness and resistance to strong caustic, have excellent clarity, melt without decomposition, and may be readily formed into useful articles such as films, containers, fibers and the like by such means as injection molding, extrusion and spinning either from the melt or solution.

The novel linear aromatic polyformal polymers used in forming the formal-carbonate block copolymers according to the present invention are isolatable, stable compounds which have utility independent from serving as intermediates. In comparison with the heretofore known aliphatic polyformals, the aromatic polyformals of this invention have been generally much higher melting points and more closely resemble in physical properties the corresponding polycarbonate homopolymers than do the aliphatic type. High molecular weight aromatic polyformals are thermoplastic materials which may be formed into films, monofilaments and the like by casting, molding and spinning techniques either in the melt or solution state.

Both the polyformal intermediate and the polycarbonate produced therefrom may be combined with conventional additives such as plasticizers, pigments, fillers and other like processing aids by well-known techniques.

A more comprehensive understanding of the invention can be obtained by referring to the following illustrative examples which are not intended to be limitative of the proper scope of the invention.

EXAMPLE 1

*Preparation of a Polyformal Resin From 2,2-(4,4'-Dihydroxy-Diphenyl)Propane*

To a 250 ml. glass reactor equipped with stirring means, thermometer, and reflux condenser, was charged 13.295 grams (~ .05 mole) of the disodium salt of 2,2-(4,4'-dihydroxy-diphenyl)propane and 6.225 grams (~ .05 mole) of methylene chlorobromide dissolved in 100 ml. of dimethyl sulfoxide. Reaction was spontaneous and evolved sufficient heat to raise the temperature from 22° C. to about 43° C. within a few minutes. Additional heat was supplied to the reactor to maintain the temperature of the reacting system at about 55 to 60° C. for about 21 hours. At the end of this period the temperature was raised to 150° C. and maintained at this level for about 3 hours. The reaction products were then cooled to about 25° C. and poured into 500 ml. and the solids consisting principally of the polyformal were separated by filtration. The polymer was again washed with water and then dissolved in 125 ml. of methylene chloride. Water soluble residues were removed from this solution by two extractions with 100 ml. of water. The organic layer containing the dissolved polyformal was then poured into 500 ml. of methanol to precipitate the polyformal. The precipitated polymer was isolated by filtration, washed with methanol, and dried in an air oven at 65° C. The yield was 9.97 grams, or 87 percent of theory. The reduced vicosity of a methylene chloride solution at 25° C. containing 0.5 gram of the polymer per 100 ml. of the solvent was found to be 0.17. The melting point determined by heating a small sample of the polymer in a thin walled capillary was 132° C.

EXAMPLE 2

*Preparation of a Polyformal Resin From 2,2-(3,5,3',5'-Tetrachloro-4,4'-Dihydroxy-Diphenyl)Propane*

The procedure described in Example 1 was repeated using the same formulation with the exception that 2,2-bis(4-hydroxy-3,5-dichlorophenyl)propane was used instead of 2,2-(4,4'-dihydroxy-diphenyl)propane. The yield of polyformal resin was 82 percent of the theoretical amount. The reduced viscosity of a methylene bromide solution at 25° C. containing 0.5 gram of the polymer per 100 ml. of the solvent was found to be 0.084. Melting point (capillary) was >265° C.

EXAMPLE 3

*Preparation of a Polyformal Resin From 4,4'-Dihydroxy-Diphenyl Sulfone*

The procedure described in Example 1 was repeated using the same formulation with the exception that 4,4'-dihydroxy-diphenyl sulfone was used instead of 2,2-(4,4'-dihydroxy-diphenyl)propane. The yield of polyformal resin was 90 percent of the theoretical amount. Reduced viscosity of a dimethylformamide solution at 25° C. containing 0.5 gram of the polymer per 100 ml. of the solvent was found to be 0.070. Melting point (capillary) was 182° C.

EXAMPLE 4

*Preparation of a Formal-Carbonate Copolymer From a Polyformal*

(A) To a 500 ml. glass reactor provided with a stirrer, thermometer, and two gas inlet tubes, was charged initially 112.0 grams of a 12 percent aqueous sodium hydroxide solution, 150 ml. of methylene chloride solvent, and 30.0 grams of a polyformal prepared from 4,4'-(dihydroxy-diphenyl)propane according to the procedure of Example 1 and having a reduced viscosity (0.5 g./100 ml. methylene chloride at 25° C.) of 0.12. Oxygen was excluded from the reactor by passing nitrogen through the apparatus for the full period of the phosgenation reaction. Phosgenation was accomplished by bubbling into the reactor six grams of phosgene over a period of approximately 90 minutes while maintaining the temperature of the reactor at 25 to 28° C. After addition of the phosgene was complete, 1.25 grams of a 60 percent aqueous solution of benzyltrimethylammonium chloride was added and stirring of the reaction mass was continued for 35 minutes while maintaining the temperature in the range of 24 to 26° C. The thus bodied polymer, which was a highly viscous material, was diluted with 700 ml. methylene chloride and washed successively with one 400 ml. portion and four 250 ml. portions of water. The washed polymer solution was acidified with concentrated hydrochloric acid and washed with three 250 ml. portions of water to a pH of 5. The organic layer was dried over magnesium sulfate, concentrated somewhat by evaporation of some of the solvent and poured into 600 ml. of ethanol to precipitate the polycarbonate resin. The product was filtered, and dried at 70° C. in an air oven. The yield was 18.9 grams (63 percent theory). Reduced viscosity at 25° C. (methylene chloride solution containing 0.2 gram polymer per 100 ml. solvent) was 1.07. The final polycarbonate block polymer was estimated to contain about 17 formal linkages per each carbonate linkage. Infra-red spectrum analysis was consistent with this estimate.

(B) The polymer from part (A) was compression molded into discs at 325° F. The discs were clear, tough and resembled in outward appearance polycarbonate homopolymers prepared from 4,4'-(dihydroxy-diphenyl)-propane. Instron test [description: Trans. Am. Soc. Mech. Eng. 71, 789, (1949)], on a film of the polymer of part (A) cast from chloroform solution indicated a modulus of 300,000 lb./sq. in. at 25° C. and a heat distortion temperature ($T^4$) of 90° C.

What is claimed is:

1. A process for preparing substantially linear aromatic thermoplastic polyformals which comprises condensing polymerizing proportions of a methylene halide with the double alkali metal salt of a dihydric phenol in an inert polar solvent.

2. A process for preparing substantially linear aromatic thermoplastic polyformals which comprises condensing polymerizing proportions of, in the presence of an inert organic polar solvent, a methylene halide and the double alkali metal salt a bisphenol compound, said bisphenol salt compound having the general formula:

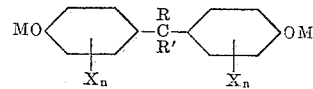

wherein M is an alkali metal, R and R' are each selected from the group consisting of hydrogen and alkyl groups containing from 1 to 10 carbon atoms, X is a halogen and $n$ is a numeral having a value of from 0 to 2.

3. A process for preparing a substantially linear, thermoplastic, aromatic polyformal which comprises condensing polymerizing proportions of reacting the double alkali metal salt of 2,2-(4,4'-dihydroxy-diphenyl)propane with a methylene halide in an inert polar solvent.

4. A process for preparing a substantially linear, thermoplastic, aromatic polyformal which comprises reacting equimolar quantities of chlorobromomethane and 2,2-(4,4'-dihydroxy-diphenyl)propane in a dimethyl sulfoxide medium at a temperature in the range of between about 50° C. and about 65° C.

5. A substantially linear, thermoplastic, aromatic polyformal, said polyformal being composed of repeating units having the general formula

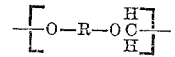

wherein R is the aromatic residue of a dihydric phenol.

6. A substantially linear, thermoplastic, aromatic polyformal, said polyformal being composed of repeating units having the general formula

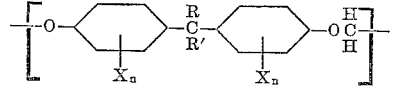

wherein R and R' are each selected from the group consisting of hydrogen and alkyl groups containing from 1 to 10 carbon atoms, X is a halogen and $n$ is a numeral having a value of from 0 to 2.

7. The substantially linear, thermoplastic, aromatic polyformal of claim 6 in which R and R' are methyl groups, X is chlorine and $n$ has a value of 2.

8. A process for preparing a substantially linear, thermoplastic, aromatic formal-carbonate copolymer which comprises condensing polymerizing proportions of a methylene halide with the double alkali metal salt of a dihydric phenol in an inert polar solvent to form an aromatic polyformal, and thereafter reacting said aromatic polyformal with phosgene in the presence of an alkali metal hydroxide.

9. A process for preparing a substantially linear, thermoplastic, aromatic, formal-carbonate copolymer which comprises condensing polymerizing proportions of the double alkali metal salt of a bisphenol having the general formula

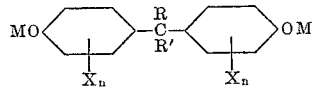

wherein M is an alkali metal, X is a halogen, $n$ is a numeral having a value from 0 to 2 and R and R' are each selected from the group consisting of hydrogen and lower alkyl groups, with a methylene halide in an inert polar solvent to form an aromatic polyformal, and thereafter reacting said polyformal with phosgene in the presence of an alkali metal hydroxide.

10. The process for preparing a substantially linear, thermoplastic, aromatic, formal-carbonate copolymer as described in claim 9 wherein R and R' are methyl groups and $n$ has a value of zero.

11. A process for preparing a substantially linear,

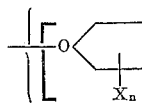

thermoplastic, aromatic, formal-carbonate copolymer which comprises condensing polymerizing proportions of the double alkali metal salt of a 2,2-(4,4'-dihydroxydiphenyl(propane with a methylene halide in an inert atmosphere and in an inert polar solvent to form the corresponding polyformal, reacting said polyformal with phosgene in the presence of an alkali metal hydroxide and an inert organic solvent for said phosgene at a temperature in the range of about 20° C. to about 40° C., and thereafter isolating the formal-carbonate copolymer.

12. A process according to claim 8 in which the dihydric phenol is 4,4-dihydroxydiphenyl sulfone.

13. A process according to claim 11 in which the inert polar solvent is dimethyl sulfoxide and the methylene halide is chlorobromomethane.

14. A process according to claim 9 in which the bisphenol compound is 2,2-bis(4-hydroxy-3,5-dichlorophenyl)-propane.

15. A substantially linear, thermoplastic, aromatic formal-carbonate copolymer, said copolymer being composed of dihydric phenol residue units linearly linked by

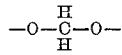

and

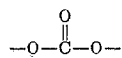

groups and having the general structural formula

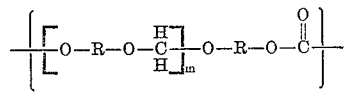

in which R is the residue of a dihydric phenol and

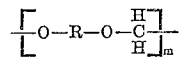

is a series consisting of at least 2 repeating aromatic formal units, and $m$ is a whole number dependent on the molecular weight.

16. A substantially linear, thermoplastic, aromatic formal-carbonate copolymer, said copolymer being composed of dihydric phenol residue units linearly linked by

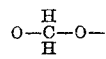

and

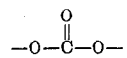

groups and having the general formula

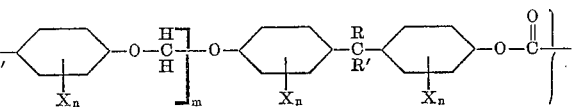

wherein

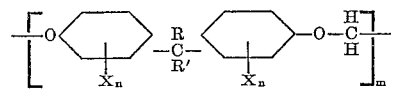

is a series consisting of at least 2 repeating aromatic formal units, R and R' are each selected from the class consisting of hydrogen and lower alkyl groups, X is halogen, and $n$ is a numeral having a value from 0 to 2, and $m$ is a whole number dependent on the molecular weight.

17. The aromatic formal-carbonate copolymer of claim 16 in which R and R' are each methyl groups and $n$ has a value of zero.

18. The aromatic formal-carbonate copolymer of claim 16 in which R and R' are each methyl groups, X is chlorine, and $n$ has a value of 2.

References Cited in the file of this patent

UNITED STATES PATENTS

| 1,543,369 | Carter et al. | June 23, 1925 |
| 1,950,516 | Prutton | Mar. 13, 1934 |
| 2,060,715 | Arvin | Nov. 10, 1936 |

OTHER REFERENCES

Schnell: Angewandte Chemie 68, No. 20, pp. 633–640, Oct. 21, 1956.